United States Patent
Berenz et al.

(10) Patent No.: US 6,904,347 B1
(45) Date of Patent: Jun. 7, 2005

(54) HUMAN PRESENCE DETECTION, IDENTIFICATION AND TRACKING USING A FACIAL FEATURE IMAGE SENSING SYSTEM FOR AIRBAG DEPLOYMENT

(75) Inventors: John J. Berenz, San Pedro, CA (US); George W. McIver, Redondo Beach, CA (US); Gregory A. Shreve, San Pedro, CA (US); Joseph W. Niesen, La Mirada, CA (US); Barry Dunbridge, Torrance, CA (US)

(73) Assignee: TRW Inc., Redondo Beach, CA (US)

( * ) Notice: Subject to any disclaimer, the term of this patent is extended or adjusted under 35 U.S.C. 154(b) by 883 days.

(21) Appl. No.: 09/607,090

(22) Filed: Jun. 29, 2000

(51) Int. Cl.[7] .......................... B60R 22/00; G06F 7/00; G06F 17/00; G06F 19/00
(52) U.S. Cl. ............................. 701/45; 701/47; 701/46; 280/735; 280/736; 280/739; 250/559.22; 250/559.23; 180/271; 180/272; 180/273
(58) Field of Search ............................ 701/45, 47, 46; 340/870.37, 825.36, 436; 342/71, 84, 104, 107; 280/735, 736, 739; 250/559.22, 559.23, 559.27; 324/65 B, 663, 61; 180/272, 273, 271; 382/100, 103, 291, 104, 111, 115, 118, 200

(56) References Cited

U.S. PATENT DOCUMENTS

| | | | |
|---|---|---|---|
| 4,648,052 A | | 3/1987 | Freidman et al. |
| 4,720,189 A | | 1/1988 | Heynen et al. |
| 5,446,661 A | * | 8/1995 | Gioutsos et al. ............... 701/45 |
| 5,482,314 A | * | 1/1996 | Corrado et al. .............. 280/735 |
| 5,829,782 A | * | 11/1998 | Breed et al. ................. 280/735 |
| 5,835,613 A | * | 11/1998 | Breed et al. ................. 382/100 |
| 5,845,000 A | | 12/1998 | Breed et al. |
| RE36,041 E | | 1/1999 | Turk et al. |
| 5,890,085 A | * | 3/1999 | Corrado et al. ............... 701/47 |
| 6,037,860 A | * | 3/2000 | Zander et al. .............. 340/436 |
| 6,060,989 A | | 5/2000 | Gehlot |

OTHER PUBLICATIONS

J. Krumm, G. Kirk; "Video Occupant Detection for Air Bag Deployment", Sandia Commercially Valuable Information, SAND97-0408, Feb. 1997, pp. 1–20.

* cited by examiner

Primary Examiner—William A. Cuchlinski, Jr.
Assistant Examiner—Ronnie Mancho
(74) Attorney, Agent, or Firm—Harness, Dickey & Pierce, P.L.C.

(57) ABSTRACT

A vehicle occupant airbag deployment system (50) that detects, identifies and tracks a person (16) in the passenger seat (18) of a vehicle (12), and provides a signal for no fire, soft fire or hard fire of the airbag (20) depending on the location of the person (16) in a crash event. The airbag deployment system (50) employs infrared emitters (30) that emit an infrared signal towards the passenger seat (18) of the vehicle (12) and an infrared detector (34) that receive reflected radiation from objects in the seat (18). Processing circuitry (52), including face recognition software, is employed to detect human face features to provide the necessary detection and tracking of the person (16). In this manner, the system (50) prevents the airbag (20) from firing if the seat (18) is not occupied by a person (16), prevents the airbag (20) from firing if a person (16) is detected, but is too close to the airbag (20), and provides a soft fire if a person (16) is detected, but is within a soft fire range of the airbag (20).

49 Claims, 3 Drawing Sheets

HUMAN PRESENCE DETECTION, IDENTIFICATION AND TRACKING USING A FACIAL FEATURE IMAGE SENSING SYSTEM FOR AIRBAG DEPLOYMENT

BACKGROUND OF THE INVENTION

1. Field of the Invention

This invention relates generally to a sensing system for deploying an airbag and, more particularly, to a sensing system that uses reflected, non-visible, near-infrared radiation to detect human facial features to determine a person's position relative to an airbag for proper airbag deployment.

2. Discussion of the Related Art

The National Highway Traffic Safety Administration requires passenger side airbags on all passenger cars manufactured after 1998. Airbags have saved thousands of lives, but safer airbag deployment systems can save even more lives. Proposals have been submitted by the National Highway Traffic Safety Administration to require advanced airbags that are safer and more efficient. Thus, there is a need in the art for an advanced airbag deployment system that determines airbag deployment depending on the detection, identify and tracking of a person in the passenger seat of the vehicle.

Future airbag deployment systems will be able to identify and track a person in the passenger seat of the vehicle. Based on this information, the system will provide signals whether to fire the airbag, fire the airbag at low velocity or fire the airbag at normal high velocity during a crash event, depending on whether a person is seated in the passenger seat, the size of the person and the position of the person relative to the airbag deployment door. In one example, if a person is detected in the passenger seat, and is some small distance (for example, within three inches) from the airbag door, then the airbag does not fire during a crash event. If a person is detected in the passenger seat, and is close (for example, between three and eight inches) to the airbag door, the airbag is fired at a lower velocity during a crash even. If the person is detected in the passenger seat, and far enough away (for example, more than eight inches) from the airbag door, then the airbag is fired at normal high velocity during a crash event.

Present passenger sensing systems typically include ultrasonic, weight, infrared and/or electromagnetic sensors to detect a passenger for airbag deployment. Ultrasonic sensing systems sense the motion of objects within the passenger seat area and determine whether the object is moving closer or farther away from the sensor location. However, ultrasonic sensors don't identify the nature of the object, and thus can't tell if it is a person or some other object, such as a bag of groceries. Similar to ultrasonic sensors, microwave sensors employed in active doppler radar systems can track objects, but cannot identify human presence. Weight sensors identify objects in the passenger seat based on applied pressure, but don't consider the passenger's location relative to the airbag. Passive IR sensors acquire thermal images of the passenger seat, but these systems are very costly. Present active IR sensors sense the relative location of the passenger relative to the airbag, but cannot identify human presence. Electromagnetic systems include LC resonant circuits where body capacitance is used to detect presence and identify objects, but these systems can not track the objects.

U.S. Pat. No. 5,835,613 issued to Breed et al., Nov. 10, 1998, discloses a vehicle interior monitoring system that claims to identify, locate and monitor persons in the passenger compartment of the vehicle. The monitoring system employs infrared emitters that illuminate the interior of the vehicle, and charge couple device (CCD) arrays that detect the radiation. Outputs from the CCD arrays are analyzed by computational devices that employ pattern recognition algorithms to classify, identify or locate the content or objects in the passenger seat. The pattern recognition system for determining vehicle occupants disclosed in the '613 patent employs complicated software that must learn the shape of an individual in all kinds of lighting situations under various conditions. Additionally, employing pattern recognition in this manner is limited in its ability to track the individual as he or she moves around in the passenger seat. Further, the ability to identify and track humans by general pattern recognition is questionably unreliable. Pattern recognition cannot identify who the person is, only detect an object's shape.

What is needed is an improved airbag deployment sensor and system that is able to effectively identify and track a person in the passenger seat of a vehicle. It is therefore an object of the present invention to provide such a sensing system for vehicle passenger airbag deployment.

SUMMARY OF THE INVENTION

In accordance with the teachings of the present invention, a vehicle occupant airbag deployment system is disclosed that detects the presence of an object in the passenger seat of a vehicle, verifies that it is a person, tracks the person's location and provides a signal for no fire, soft fire, or hard fire of the airbag depending on the location and/or size of the person during a crash event. The airbag deployment system employs short wavelength infrared emitters that emit an infrared signal towards the passenger seat of the vehicle, and an infrared detector, such as a CMOS sensor used as a video signal array, that receives reflected infrared illumination from objects in the seat. Processing circuitry, including face recognition software, is employed to detect a human face to provide the necessary reliable detection identification, and tracking of the person. In this manner, the system prevents the airbag from firing if the passenger seat is not occupied by a person, prevents the airbag from firing if a person is detected, but is too close to the airbag, and provides a soft fire if a person is detected, but is within a soft fire range of the airbag. Also, if the person is a child or small female, the system can prevent airbag firing.

Additional objects, advantages and features of the present invention will become apparent from the following description and appended claims, taken in conjunction with the accompanying drawings.

DETAILED DESCRIPTION OF THE PREFERRED EMBODIMENTS

The following discussion of the preferred embodiments directed to an airbag deployment system that employs human facial feature recognition is merely exemplary in nature, and is in no way intended to limit the invention or its applications or uses.

According to one embodiment of the present invention, a technique for detecting, identifying and tracking a person in the passenger seat of a vehicle is disclosed. As discussed above, it is sometimes desirable to deploy a passenger side airbag in a vehicle at low velocity, or not deploy the airbag, during a crash event, depending on whether a person is occupying the passenger seat of the vehicle, the proximity of the person to the airbag door, and the size of the person. According to the present invention, the identification and tracking of the person is determined by face recognition software, in particular, software that recognizes and tracks the person's eyes and other facial features. Tracking can take place that way at many head angles and poses. The software algorithm would use calibrated face and feature separation to estimate range. The tracking of a localized area on the human face allows more image frames to be acquired per second, permitting more frequent tracking of the person. The more frequent tracking of the facial features will prevent acquiring a blurry image because the image is updated more frequently.

Various software is known in the art that processes data from video data patterns received from an object being analyzed, and determines whether the object has a face. For example, such software includes the Visionics Face-It software, well known to those skilled in the art. It is stressed that the present invention is not limited to any particular facial feature mapping function, but can include any known algorithm, suitable for the purposes described herein, for recognizing facial features, whether it be two-dimensional or three-dimensional, that are then also to be used for ranging functions, as well. Further, according to the present invention, ranging algorithms are used in combination with the know face recognition software.

As will be discussed in detail below, the present invention employs infrared radiation reflected off of objects in the passenger side of the passenger compartment of a vehicle that is received by an electronic video camera. The video camera generates the electrical signals and image used by the face recognition software to determine the presence identify and tracking of the person.

Figure 1:
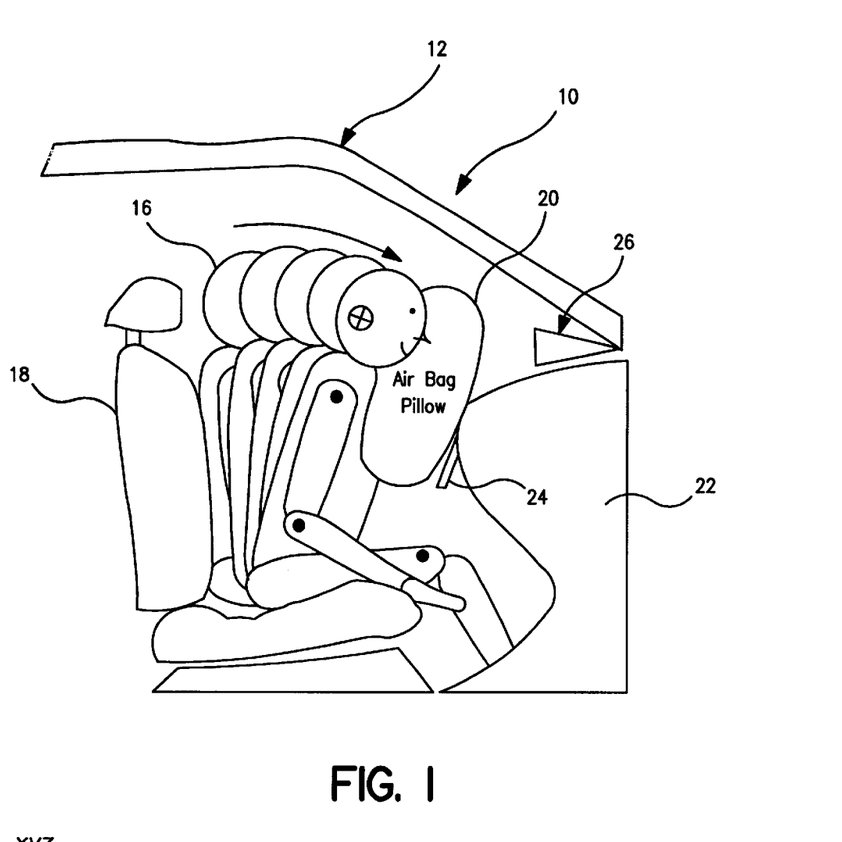
FIG. 1 is a side, cut-away, plan view of a person in the passenger seat of a vehicle in connection with an image sensing system for airbag deployment, according to an embodiment of the present invention.

FIG. 1 is a cut-away, side, plan view of the passenger side compartment 10 of a vehicle 12. In this depiction, a person 16 is shown in the passenger seat 18, where the person 16 is moving forward during a crash event. An airbag pillow 20 is shown being deployed through an airbag door 24 housed in an instrument panel 22 during the crash event.

Figure 2:
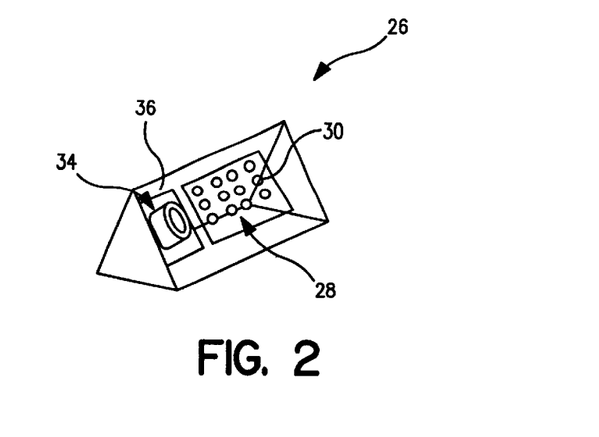
FIG. 2 is a perspective view of a video camera and LED illuminator unit employed in the airbag deployment system of the present invention.

A video camera and IR LED illuminator unit 26 is mounted on the instrument panel 22 at a location suitable for the purposes described herein. FIG. 2 is a perspective view of the unit 26 removed from the vehicle 12. The unit 26 includes a cluster 28 of IR LEDs 30. A plurality of LEDs 30 is provided to generate the necessary intensity for daylight operation. The cluster 28 emits a beam of IR radiation towards the person 16 that is reflected therefrom back towards the unit 26. A video camera 34 is provided in the unit 26 to receive the reflected radiation from the person 16. The video camera 34 is used by way of a non-limiting example in that any detector that detects infrared radiation suitable for the purposes described herein can be used.

Figures 3, 6, 7:
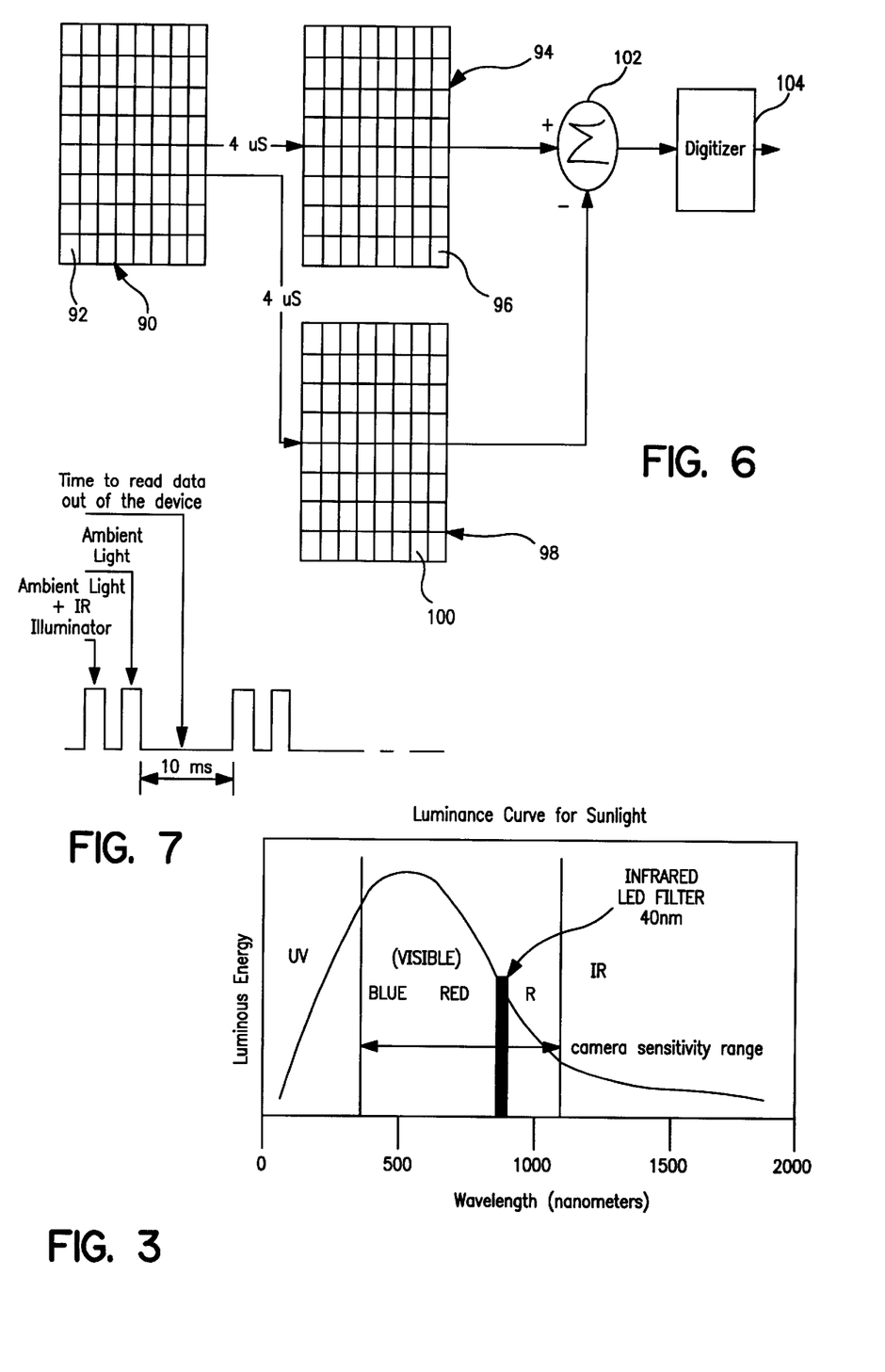
FIG. 3 is a graph with wavelength on the horizontal axis and luminous energy on the vertical axis showing the luminance curve for sunlight.
FIG. 6 is a schematic diagram depicting a frame differencing technique used in the airbag deployment system of the present invention.
FIG. 7 is a timing diagram for the frame differencing technique of the invention.

A filter 36 is provided over the camera 34 to filter out radiation that is not within the desirable infrared range. The filter 36 can be any filter suitable for the purposes described herein, such as a $TiO_2$ filter or a polarizing filter. The filter layers and thickness can be chosen to transmit the IR image to the detector, but to reflect the visible image away from the detector. The polarizing filter can be used to reduce visible light to the detector using electro-optical polarization that passes the IR wavelengths, but strongly attenuates the non-IR wavelengths. FIG. 3 shows the luminance curve for sunlight, where the filter 36 passes infrared radiation in the 40 nm bandpass window. The filter 36 provides some protection against sunlight that may affect the operation of the airbag deployment system, and recognition of the face of the person 16.

In this embodiment of the present invention, a single camera is used to acquire and monitor the range of the person 16. The software employed to perform this function utilizes two separate locations on the occupant's face to provide the ranging. In a preferred embodiment, it is the person's eyes that are detected to provide the triangulation for ranging purposes. However, as will be appreciated by those skilled in the art, other facial features of the person 16 can also be used, such as the person's ears, etc. Also, the software algorithm allows the person's head size to be determined so that both eyes do not need to be in view to track the person after he has been acquired. Additionally, the software can be used to view other parts of the person's body, such as the person's torso, in combination with the facial feature or head size detection.

Because human facial features are unique, a database can be used to store specific information, such as eye-to-eye separation, about a person, so that the software can particularly identify that person. This is important, in one example, so that the system can identify children and fifth-percent females, and inhibit air bag firing for these people, as required by government mandated regulations. Also, being able to specifically identify a person improves the ranging accuracy of the system because the system knows that person's eye separation or other specific facial features.

Figure 4:
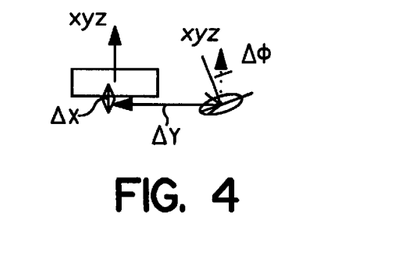
FIG. 4 is a representation of camera orientation and position parameters with respect to the center and normal of the airbag door.

The acquisition and tracking software needs to be calibrated for a particular seat position, airbag position, vehicle makeup, etc. FIG. 4 is a representation of the camera orientation and position parameters with respect to the center and normal of the airbag door 24. The three parameters that must be estimated in the vehicle for ranging according to the invention after the camera and Visionics Face-It software are calibrated include two position offsets and one angular offset. The two position offsets are the lateral offset of the camera 34 with respect to the center of the airbag ($\Delta Y$), measured laterally and perpendicularly to the normal vector out of the center of the airbag door 24, and the front or back offset ($\Delta X$) of the camera 34 with respect to the center of the airbag door 24, measured along an axis parallel to the normal out of the center of the airbag door 24. The angular parameter is the azimuth offset ($\Delta\theta$) between the optical axis of the camera 34 and the normal vector coming out of the center of the airbag 20. Only two of these parameters, $\Delta X$ and $\Delta\Phi$, are used in the modified monocular distance equation.

A calibration procedure, described below, can be used to determine $\Delta Y$, $\Delta X$ and $\Delta \Phi$. There is a trade off between measuring a large number of calibration points and linearly interpolating between them or measuring a small number of calibration points and non-linearly interpolating between them. In theory, calibrating with a large number of points would not require a model for estimating that is described herein. The cost of making the large number of measurements necessary for a brute force calibration and the possibility that out of range operation of the camera 34 or software might occur unnoticed with brute force calibration must be considered before using that approach. The approach used herein uses a small number of calibration tests in order to form a model for interpolation.

From FIG. 4, the following equations can be written in order to relate measurements made in the airbag door reference frame (xyz) to those made in the camera lens reference frame (xyz). Only face positions in front of the airbag door (x>o) are considered in the following equations. For $\rho, \theta$ (pitch or elevation angle) and $\phi$ (yaw or azimuth angle) defined in the cameras spherical coordinate system, the equations for displacements x and y in the airbag coordinate system are:

$$x = -\Delta X + \rho \sin(\theta + \Delta\theta)\cos(\phi + \Delta\phi) \quad (1)$$

$$y = -\Delta Y + \rho \sin(\theta + \Delta\theta)\sin(\phi + \Delta\phi) \quad (2)$$

This assumes that $\theta + \Delta\theta$ is fixed during the calibration. Rearranging equations (1) and (2) yields:

$$\frac{y + \Delta Y}{x + \Delta X} = \tan(\phi + \Delta\Phi) \quad (3)$$

Making eye coordinate readout measurements at fixed $x + \Delta X$, and then taking the slope of the tangent with respect to changes in y yields:

$$\frac{1}{x + \Delta X}\bigg|\text{fixed\_x} = \frac{d\tan(\phi + \Delta\Phi)}{dy} \quad (4)$$

Knowing x and the result on the right side of equation (4), $\Delta X$ can be determined. Knowing $\Delta X$, equation (3) and the measured data can be used to determine $\Delta Y$. Then, using $\Delta X$ and $\Delta Y$, equation (3) and the data, $\Delta\phi$ can be determined. Using equation (3), and the fact that:

$$\text{eye\_separation\_distance} = Y_{rt\_eye} - y_{left\_eye}, \quad (5)$$

the modified monocular equation follows from equation (6) for defining the objective parameter x, or the eye to airbag distance.

$$x = -\Delta X + \left|\frac{\text{eye\_separation\_distance}}{\tan(\phi_{\text{left\_eye}} + \Delta\Phi) - \tan(\phi_{\text{rt\_eye}} + \Delta\Phi)}\right| \quad (6)$$

The calibration table consists of a lookup table of the SDK determined eye coordinate as a pixel value linked to the associated ray slope, as viewed in the camera coordinate system. Equation (6) can be simplified in terms of ray slopes (tangents of singular angles), so that the calibration table can be used directly to determine the eye to airbag distance from monocular operation. Employing the tangent trigonometry identity in equation (7) below, $$\tan(a+b) = \frac{\tan(a) + \tan(b)}{1 - \tan(a)\tan(b)} \quad (7)$$

and applying this identify to equation (6), leaves the modified monocular equation in a form that can be used by direct look up of tangent/slopes from the calibration lookup table. This equation is given in equation (8) below.

$$x = -\Delta X + \left|\frac{\text{eye\_separation\_distance}}{\frac{\tan(\phi_{\text{left\_eye}}) + \tan(\Delta\Phi)}{1 - \tan(\phi_{\text{left\_eye}})\tan(\Delta\Phi)} - \frac{\tan(\phi_{\text{rt\_eye}}) + \tan(\Delta\Phi)}{1 - \tan(\phi_{\text{rt\_eye}})\tan(\Delta\Phi)}}\right| \quad (8)$$

Figure 5:
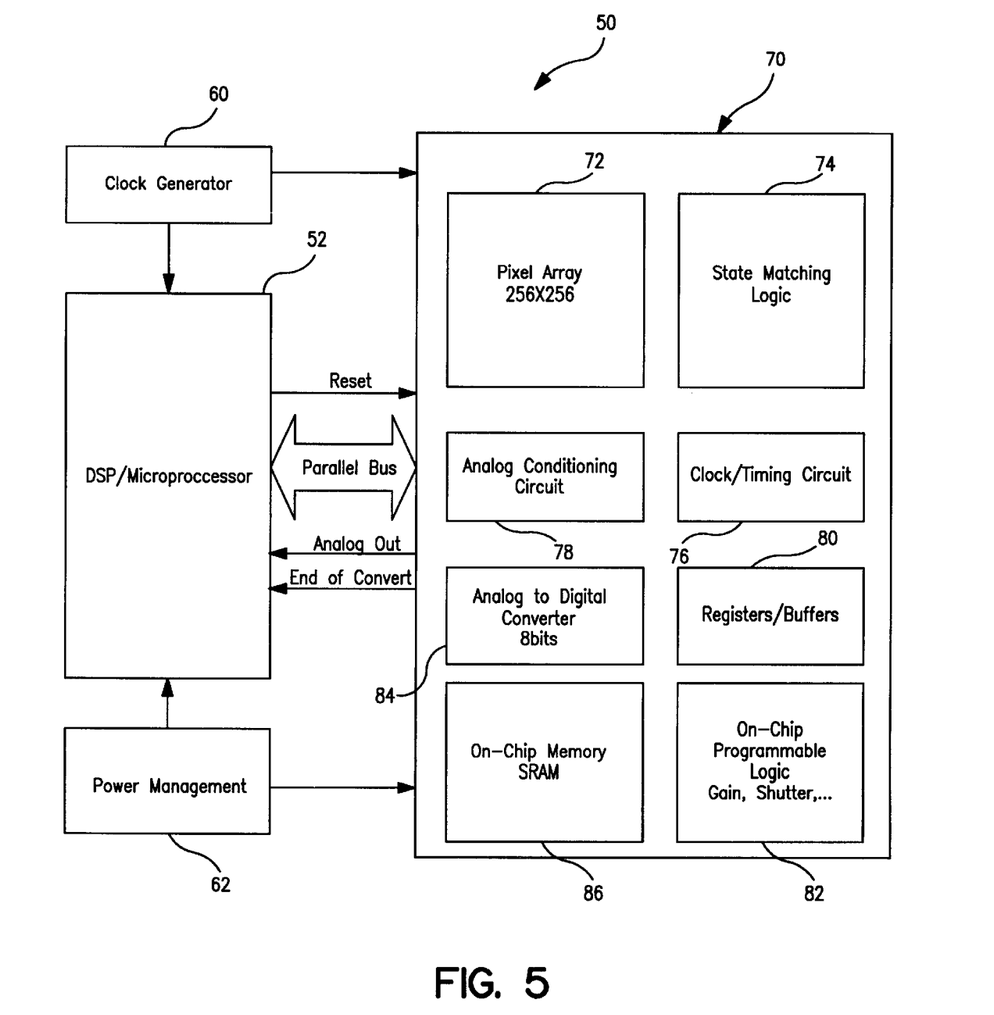
FIG. 5 is a block diagram of the airbag deployment system of the present invention.

FIG. 5 is a block diagram of an imaging system 50 of the invention including a digital signal processor (DSP) 52. The DSP 52 includes the face recognition software and ranging functions that performs the analysis on the image generated by the camera 34. A clock generator 60 provides timing for the various digital devices in the system 50, and a power management system 62 provides the power. The DSP 52 is connected to a CMOS chip 70 including a pixel array 72 that represents the IR detector, such as the camera 34. In this example, the pixel array 72 includes 256×256 pixels to provide the desired level of resolution. The CMOS chip 70 also includes various elements for timing and control purposes, including state matching logic 74, clock/timing circuitry 76, analog conditioning circuit 78, registers/buffers 80, on-chip programmable logic circuitry 82, etc. Additionally, an analog-to-digital converter 84 is also provided to convert the analog signal from the pixel array 72 to a representative digital signal. An on-chip SRAM memory 86 is shown for storage purposes, but can be off-chip as well. The operation of these devices in the system described herein would be apparent to those skilled in the art.

In one embodiment, the infrared LEDs 30 are continuously on to provide the reflected radiation received by the camera 34. However, typically some kind of filtering or signal processing must be done to correct for the problems caused by direct sunlight on the camera 34 that make it through the filter 36. Particularly, the system 50 needs to be able to distinguish between shadows caused by sunlight and actual edges of features on the occupant 16. According to the present invention, a frame differencing technique is employed that synchronously pulses the LEDs 30 on for a predetermined period of time and a predetermined number of frames of video data, and then off for a predetermined period of time over the same number of frames of video data. Then, the frames of data are subtracted from each other so that the frames without IR illumination can be subtracted from the frames with IR illumination, and the background can be eliminated. The detector is electronically shuttered synchronously with the pulses to provide exposure control. The frame differencing technique described herein is used in conjunction with the infrared pulsing to achieve the desired result. In other words, the frame differencing is synchronized to the infrared pulses.

The concept of frame differencing is the time-aperture, pixel-level storage of images using natural illumination only and natural illumination with added infrared illumination. Frame differencing allows these images to be subtracted to mitigate the effects of strong visible illumination. The set-up includes a neutral density filter that sets the IR illumination, plus worst case background to maximize analog-to-digital converter input. Face recognition requires that the worst case analog-to-digital range for the differenced image be 5 to 6 bits. The visible light would fit within the remaining range allowed by the analog-to-digital converter. The image differencing is either performed in the analog domain, where two pixel level capacitors are charged, one at each illumination level, or in the digital domain where a RAM memory of the digitized pixel output is taken at each illumination. The frame differencing acts to subtract out the illumination effects of the visible illumination, and to improve the image contrast. The frame differencing function can be performed in the acquisition/high bandwidth generation mode or in the narrow bandwidth track mode using pulsed LED illumination. The number of the electrons from the pulsed IR light source must be 10 times greater than the photon noise of the ambient illumination. Here, the noise of the ambient illumination is the square root of two times the number of electrons within the sun intensity, because two image frames are being acquired for every one IR image received.

FIG. 6 is a representation of how the frame differencing is performed in the camera 34, according to one embodiment of the present invention. FIG. 7 is a signal timing line showing the operation of the frame differencing technique of the invention. A pixel array 90 in the camera 34 receives radiation from the scene for a predetermined time period (10 $\mu$s) during a pulse of IR from the LEDs 30. At this time, the pixel array 90 receives ambient light and infrared light. The charge stored by each pixel or photodiode 92 in the array 90 is then transferred to a charge storage site 94 made up of a plurality of capacitors, one capacitor 96 for each pixel 92. About 10 $\mu$s later, at the end of the pulse from the cluster 28, the pixel array 90 detects just the ambient light for the same time period. The charge received by the pixel array 90 at this time period is stored in a capacitor storage site 98, having capacitors 100. An electronic shutter is employed in the detector to open and close at the appropriate time synchronously with the pulses of IR radiation for the operation described herein.

The two storage sites 94 and 98 are summed in a summation amplifier 102. The difference between the two storage sites 94 and 98 is then digitized by an analog-to-digital converter 104, and represents the frame of data where the ambient light has been removed. The readout of data takes about 10 ms, then at the next time period, the next pulse from the cluster 28 occurs. The complete frame differencing process can be performed on a single chip in CMOS where the pixel array 90 and the storage sites 94 and 98 are together. In an alternate embodiment, the frame differencing is performed at a different time period at an off-chip site, where the storage sites 94 and 98 are RAM.

The frame differencing technique of the invention can be described in the following manner. The variables are defined as ambient illumination I(x,y), direct ambient illumination T(x,y), scene reflectance R(x,y), and modulated source as L when on, and O when off. The response of the camera 34 is proportional to the product of reflectance and illumination.

$$S(x,y,\text{OFF})=k^*(I(x,y)^*R(x,y))$$

$$S^*(x,y,\text{ON})=k^*((L+I(x,y))^*R(x,y))+T(x,y)$$

$$D(x,y)=S(x,y,\text{ON})-S(x,y,\text{OFF})=KL^*R(x,y)$$

This difference scene has much smaller dynamic range than the simple image S(x,y,OFF). The same benefit can be derived by reading out the frame with LED, then reading the frame without LED and subtracting the frames external to the camera 34. The penalty is increased dynamic range required to avoid saturation.

L must be much greater than the photon noise on I. Thus, I is made as small as possible by using a narrow bandpass filter aligned in frequency to L. The raw sampling rate has to be twice the requirement set by the object tracking because two frames are differenced to get one frame to supply the face recognition software. The LEDs 30 have to be much faster. The IR radiation source has to be modulated such that all emission is during the time when all detectors are active. If the integration times of all pixels in the detector are not aligned, the available time for the source to be ON is reduced by the worst case misalignment.

The foregoing discussion discloses and describes merely exemplary embodiments of the present invention. For example, a pulsed laser diode could be used in place of the LEDs. One skilled in the art will readily recognize from such discussion and from the accompanying drawings and claims, that various changes, modifications and variations can be made therein without departing from the spirit and scope of the invention as defined in the following claims.

What is claimed is:

1. A system for deploying a passenger side airbag in a vehicle for restraining a passenger, said airbag being mounted in an instrument panel of the vehicle in front of a passenger seat, said system comprising:

an infrared source generating an infrared beam directed towards the passenger seat;

an infrared detector responsive to infrared radiation reflected from objects in the passenger seat, said detector generating signals indicative of an image of the objects in the passenger seat based on the reflected infrared radiation; and a processor responsive to the image from the detector, said processor including face recognition software that identifies, acquires and tracks specific and individual facial features of the passenger, said processor causing the airbag to deploy in a crash event if the passenger is detected in the passenger seat and is a predetermined distance away from the instrument panel;

wherein the infrared source is a cluster of infrared light emitting diodes;

and wherein the infrared detector is an electronic video camera.

2. The system according to claim 1 wherein the cluster of LEDs and the electronic camera are provided as a single unit mounted to the instrument panel in front of the passenger seat.

3. A system for deploying a passenger side airbag in a vehicle for restraining a passenger, said airbag being mounted in an instrument panel of the vehicle in front of a passenger seat, said system comprising:

an infrared source generating an infrared beam directed towards the passenger seat;

an infrared detector responsive to infrared radiation reflected from objects in the passenger seat, said detector generating signals indicative of an image of the objects in the passenger seat based on the reflected infrared radiation; and a processor responsive to the image from the detector, said processor including face recognition software that identifies, acquires and tracks specific and individual facial features of the passenger, said processor causing the airbag to deploy in a crash event if the passenger is detected in the passenger seat and is a predetermined distance away from the instrument panel;

wherein the processor tracks the passengers eyes;

and wherein the processor determines the distance the passenger is from the instrument panel by the separation distance of the passengers eyes.

4. A system for deploying a passenger side airbag in a vehicle for restraining a passenger, said airbag being mounted in an instrument panel of the vehicle in front of a passenger seat, said system comprising:

an infrared source generating an infrared beam directed towards the passenger seat;

an infrared detector responsive to infrared radiation reflected from objects in the passenger seat, said detector generating signals indicative of an image of the objects in the passenger seat based on the reflected infrared radiation; and a processor responsive to the image from the detector, said processor including face recognition software that identifies, acquires and tracks specific and individual facial features of the passenger, said processor causing the airbag to deploy in a crash event if the passenger is detected in the passenger seat and is a predetermined distance away from the instrument panel;

and wherein the processor determines the distance the passenger is from the instrument panel by the distance between two locations on the passenger's face.

5. A system for deploying a passenger side airbag in a vehicle for restraining a passenger, said airbag being mounted in an instrument panel of the vehicle in front of a passenger seat, said system comprising:

an infrared source generating an infrared beam directed towards the passenger seat;

an infrared detector responsive to infrared radiation reflected from objects in the passenger seat, said detector generating signals indicative of an image of the objects in the passenger seat based on the reflected infrared radiation; and a processor responsive to the image from the detector, said processor including face recognition software that identifies, acquires and tracks specific and individual facial features of the passenger, said processor causing the airbag to deploy in a crash event if the passenger is detected in the passenger seat and is a predetermined distance away from the instrument panel;

wherein the infrared detector includes a pixel array of photodiodes.

6. A system for deploying a passenger side airbag in a vehicle for restraining a passenger, said airbag being mounted in an instrument panel of the vehicle in front of a passenger seat, said system comprising:

an infrared source generating an infrared beam directed towards the passenger seat;

an infrared detector responsive to infrared radiation reflected from objects in the passenger seat, said detector generating signals indicative of an image of the objects in the passenger seat based on the reflected infrared radiation; and a processor responsive to the image from the detector, said processor including face recognition software that identifies, acquires and tracks specific and individual facial features of the passenger, said processor causing the airbag to deploy in a crash event if the passenger is detected in the passenger seat and is a predetermined distance away from the instrument panel;

wherein the infrared source is pulsed on for a predetermined time at predetermined intervals;

and wherein the pulsed source and the detector are synchronized such that a difference of successive frames represents an image free of ambient light variations.

7. The system according to claim 6 where said difference of successive frames is directly performed by the detector.

8. The system according to claim 6 wherein frames of data are stored in the detector when the source is on and the source is off to subtract out visible light.

9. A system for deploying a passenger side airbag in a vehicle for restraining a passenger, said airbag being mounted in an instrument panel of the vehicle in front of a passenger seat, said system comprising:

an infrared source generating an infrared beam directed towards the passenger seat;

an infrared detector responsive to infrared radiation reflected from objects in the passenger seat, said detector generating signals indicative of an image of the objects in the passenger seat based on the reflected infrared radiation, said source and detector being part of a single unit mounted to the instrument panel; and a processor responsive to the image from the detector, said processor including face recognition software that identifies, acquires and tracks facial features of the passenger, said processor causing the airbag to deploy in a crash event if the passenger is detected in the passenger seat and is a predetermined distance away from the instrument panel, wherein the processor tracks the passenger's eyes and determines the distance the passenger is from the instrument panel by the separation distance of the passenger's eyes.

10. The system according to claim 9 wherein the infrared source is a cluster of infrared light emitting diodes.

11. The system according to claim 9 wherein the detector is an electronic camera.

12. The system according to claim 9 further comprising an infrared filter positioned in front of the detector.

13. The system according to claim 9 wherein the infrared source is pulsed on for a predetermined time at predetermined intervals.

14. The system according to claim 13 wherein the pulsed source and the detector are synchronized such that a difference of successive frames represents an image free of ambient light variations.

15. The system according to claim 14 wherein said difference of successive frames is directly performed by the detector.

16. The system according to claim 9 wherein frames of data are stored when the source is on and the source is off to subtract out visible light.

17. The system according to claim 9 wherein the detector includes a pixel array of photodiodes.

18. A method of determining whether to deploy a passenger side airbag in a vehicle, said method comprising the steps of:

directing a beam of infrared radiation towards a passenger seat of the vehicle;

detecting reflected infrared radiation from objects in the passenger seat;

using face recognition processing to determine whether a person is in the passenger seat, said face recognition processing identifying specific and individual facial features of the passenger; and determining whether to fire the airbag by whether a face is detected and the range of the person relative to the airbag;

wherein the step of directing the beam of radiation includes pulsing the beam of radiation;

and further comprising the step of employing a frame differencing technique to subtract ambient radiation from detected images.

19. A system for deploying a passenger airbag in a vehicle for restraining a passenger, said airbag being mounted in an instrument panel of the vehicle in front of a passenger seat, said system comprising:
- a cluster of infrared light emitting diodes generating an infrared beam directed towards the passenger seat;
- an electronic video camera responsive to infrared radiation reflected from objects in the passenger seat, said detector generating signals indicative of an image of the objects in the passenger seat based on the reflected infrared radiation; and
- a processor responsive to the image from the detector, said processor including human presence detection software that identifies, acquires and tracks the passenger, said processor causing the airbag to deploy in a crash event if the passenger is detected in the passenger seat and is a predetermined distance away from the instrument panel.

20. The system according to claim 19 wherein the cluster of LEDs and the electronic camera are provided as a single unit mounted to the instrument panel in front of the passenger seat.

21. The system according to claim 19 wherein the processor tracks the passenger's eyes.

22. The system according to claim 19 further comprising an infrared filter positioned in the camera to filter the received radiation.

23. The system according to claim 19 wherein the light emitting diodes are pulsed on for a predetermined time at predetermined intervals.

24. The system according to claim 19 wherein the processor includes a database that stores information about specific individuals, said processor using the database to identify the passenger.

25. A system for deploying a passenger airbag in a vehicle for restraining a passenger, said airbag being mounted in an instrument panel of the vehicle in front of a passenger seat, said system comprising:
- an infrared source generating an infrared beam directed towards the passenger seat;
- an infrared detector responsive to infrared radiation reflected from objects in the passenger seat, said detector generating signals indicative of an image of the objects in the passenger seat based on the reflected infrared radiation; and
- a processor responsive to the image from the detector, said processor including human presence detection software that identifies, acquires and tracks the passenger, said processor causing the airbag to deploy in a crash event if the passenger is detected in the passenger seat and is a predetermined distance away from the instrument panel, wherein the processor tracks the passenger's eyes and determines the distance the passenger is from the instrument panel by the separation distance of the passenger's eyes.

26. A system for deploying a passenger airbag in a vehicle for restraining a passenger, said airbag being mounted in an instrument panel of the vehicle in front of a passenger seat, said system comprising:
- an infrared source generating an infrared beam directed towards the passenger seat;
- an infrared detector responsive to infrared radiation reflected from objects in the passenger seat, said detector generating signals indicative of an image of the objects in the passenger seat based on the reflected infrared radiation; and
- a processor responsive to the image from the detector, said processor including human presence detection software that identifies, acquires and tracks the passenger, said processor causing the airbag to deploy in a crash event if the passenger is detected in the passenger seat and is a predetermined distance away from the instrument panel, wherein the processor determines the distance the passenger is from the instrument panel by the distance between two locations on the passengers face.

27. The system according to claim 26 wherein the processor tracks the passenger's eyes.

28. The system according to claim 26 further comprising an infrared filter positioned in front of the detector.

29. The system according to claim 26 wherein the infrared source is pulsed on for a predetermined time at predetermined intervals.

30. The system according to claim 26 wherein the processor includes a database that stores information about specific individuals, said processor using the database to identify the passenger.

31. A system for deploying a passenger airbag in a vehicle for restraining a passenger, said airbag being mounted in an instrument panel of the vehicle in front of a passenger seat, said system comprising:
- an infrared source generating an infrared beam directed towards the passenger seat;
- an infrared detector responsive to infrared radiation reflected from objects in the passenger seat, said detector generating signals indicative of an image of the objects in the passenger seat based on the reflected infrared radiation, wherein the infrared detector includes a pixel array of photodiodes; and
- a processor responsive to the image from the detector, said processor including human presence detection software that identifies, acquires and tracks the passenger, said processor causing the airbag to deploy in a crash event if the passenger is detected in the passenger seat and is a predetermined distance away from the instrument panel.

32. The system according to claim 31 wherein the processor tracks the passenger's eyes.

33. The system according to claim 31 further comprising an infrared filter positioned in front of the detector.

34. The system according to claim 31 wherein the infrared source is pulsed on for a predetermined time at predetermined intervals.

35. The system according to claim 31 wherein the processor includes a database that stores information about specific individuals, said processor using the database to identify the passenger.

36. A system for deploying a passenger airbag in a vehicle for restraining a passenger, said airbag being mounted in an instrument panel of the vehicle in front of a passenger seat, said system comprising:
- an infrared source generating an infrared beam directed towards the passenger seat, wherein the infrared source is pulsed on for a predetermined time at predetermined intervals;
- an infrared detector responsive to infrared radiation reflected from objects in the passenger seat, wherein the infrared source is pulsed on for a predetermined time at predetermined intervals, said detector generating signals indicative of an image of the objects in the passenger seat based on the reflected infrared radiation, wherein the pulsed source and the detector are synchronized such that a difference of successive frames represents an image free of ambient light variations; and a processor responsive to the image from the detector, said processor including human presence detection software that identifies, acquires and tracks the passenger, said processor causing the airbag to deploy in a crash event if the passenger is detected in the passenger seat and is a predetermined distance away from the instrument panel.

37. The system according to claim 36 wherein said difference of successive frames is directly performed by the detector.

38. The system according to claim 36 wherein the processor tracks the passenger's eyes.

39. The system according to claim 36 further comprising an infrared filter positioned in front of the detector.

40. The system according to claim 36 wherein the infrared source is pulsed on for a predetermined time at predetermined intervals.

41. The system according to claim 36 wherein the processor includes a database that stores information about specific individuals, said processor using the database to identify the passenger.

42. A system for deploying a passenger airbag in a vehicle for restraining a passenger, said airbag being mounted in an instrument panel of the vehicle in front of a passenger seat, said system comprising:

an infrared source generating an infrared beam directed towards the passenger seat;

an infrared detector responsive to infrared radiation reflected from objects in the passenger seat, said detector generating signals indicative of an image of the objects in the passenger seat based on the reflected infrared radiation; and a processor responsive to the image from the detector, said processor including human presence detection software that identifies, acquires and tracks the passenger, said processor causing the airbag to deploy in a crash event if the passenger is detected in the passenger seat and is a predetermined distance away from the instrument panel, wherein frames of data are stored in the detector when the source is on and the source is off to subtract out visible light.

43. The system according to claim 42 wherein the processor tracks the passenger's eyes.

44. The system according to claim 42 further comprising an infrared filter positioned in front of the detector.

45. The system according to claim 42 wherein the infrared source is pulsed on for a predetermined time at predetermined intervals.

46. The system according to claim 42 wherein the processor includes a database that stores information about specific individuals, said processor using the database to identify the passenger.

47. A method of determining whether to deploy a passenger airbag in a vehicle, said method comprising the steps of:

directing a pulsed beam of infrared radiation towards a passenger seat of the vehicle;

detecting reflected infrared radiation from objects in the passenger seat;

employing a frame differencing technique to subtract ambient radiation from detected images;

using face recognition processing to determine whether a person is in the passenger seat; and determining whether to fire the airbag by whether a face is detected and the range of the person relative to the airbag.

48. The method according to claim 47 wherein the step of using face recognition processing includes recognizing and determining a person's face by his or her eyes.

49. The method according to claim 47 wherein the step of determining whether to fire the airbag includes determining whether to soft fire or hard fire the airbag by the distance of the person from the detector and/or the size of the person.

* * * * *